US 6,643,517 B1

(12) United States Patent
Steer

(10) Patent No.: US 6,643,517 B1
(45) Date of Patent: Nov. 4, 2003

(54) METHOD OF USING LOCATION INFORMATION FOR INTERFERENCE PROTECTION

(75) Inventor: David G. Steer, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/418,488

(22) Filed: Oct. 15, 1999

(51) Int. Cl.$^7$ ................................................ H04Q 7/20
(52) U.S. Cl. ..................................... 455/456.4; 455/561
(58) Field of Search ............................... 455/456, 457, 455/418, 419, 420, 561, 456.1, 456.4, 456.6

(56) References Cited

U.S. PATENT DOCUMENTS

| | | | |
|---|---|---|---|
| 5,280,632 A | * 1/1994 | Jung-Gon | 455/70 |
| 5,390,338 A | 2/1995 | Bodin et al. | 455/33.1 |
| 5,442,805 A | 8/1995 | Sagers et al. | 455/33.1 |
| 5,542,100 A | * 7/1996 | Hatakeyama | 455/456 |
| 5,940,764 A | 8/1999 | Mikami | |
| 6,011,973 A | * 1/2000 | Valentine et al. | |
| 6,055,434 A | * 4/2000 | Seraj | 455/456 |
| 6,085,096 A | * 7/2000 | Nakamura | |
| 6,163,695 A | * 12/2000 | Takemura | |
| 6,201,973 B1 | * 3/2001 | Kowaguchi | |
| 6,308,061 B1 | * 10/2001 | Criss et al. | 455/418 |
| 6,343,212 B1 | * 1/2002 | Weber et al. | 455/404 |
| 6,349,206 B1 | * 2/2002 | Reichelt et al. | 455/421 |

FOREIGN PATENT DOCUMENTS

| | | | |
|---|---|---|---|
| EP | 30046 | 4/1998 | ............ H04Q/7/38 |
| GB | 2226730 A | * 7/1990 | |
| JP | H09051576 | 2/1997 | ............ H04Q/7/38 |
| JP | H10313481 | 11/1998 | |

* cited by examiner

Primary Examiner—Nguyen T. Vo

(57) ABSTRACT

A problem with mobile radio systems is the potentially harmful interference they may cause to other electronic equipment. Such interference can be dangerous and even life-threatening in hospitals and aircraft. The present invention provides a method to protect against improper operation of mobile radios, e.g. cellular phones, by making use of a "location technique" and knowledge of the mobile's location to determine if the mobile is inside a protected region and thus needs to constrain its operation. Two modes of operation are possible: one utilising a location technique that is part of the mobile radio system, and the second utilising a location service that is independent of the mobile radio system (such as the satellite based GPS system). The present invention includes control of operation, such as no audible ringing, or outgoing calls only, as well as possible control of transmitter power to protect against interference. This allows for the safe operation of mobile radios in regions where interference could cause serious problems and also provides a method for maintaining social etiquette. Protected region boundaries and conditions of restricted operation are broadcast by base stations on the broadcast control channels. If the location of a mobile is determined to be within a protected region defined by the broadcast message, its operation is limited to the conditions specified.

9 Claims, 3 Drawing Sheets

METHOD OF USING LOCATION INFORMATION FOR INTERFERENCE PROTECTION

FIELD OF THE INVENTION

This invention relates to mobile radio communications systems and, more particularly, to a method and apparatus for controlling their operation near sensitive areas.

BACKGROUND OF THE INVENTION

A significant problem with mobile radio communications systems is the potentially harmful interference they may cause to other electronic equipment. As the use of mobile radios becomes more widespread, the occurrence of this interference will become more frequent. The problem is usually caused by the close proximity of the mobile radio transmitter to another piece of electronic equipment and the sensitivity of that equipment to extraneous radio signals.

There are two places where this problem is particularly dangerous, and perhaps life-threatening. These are in hospitals and in aircraft. As electronic control systems pervade other environments, however, the areas of danger will increase. Interference to automobile electronic braking systems, airbag actuators, or train system controls are examples of the areas where radio interference must be prevented to preserve the safety of operators and passengers.

Presently, the method used to prevent interference of this sort is simply to prohibit the use of mobile radios in sensitive areas. Passengers on aircraft are routinely told not to use their cellular phones. Doctors and staff are routinely told not to bring their cellular phones into some areas of the hospital. Unfortunately not everyone understands the danger and some operate their phones anyway. Some people use their cellular phones in aircraft. Even some radio engineers have said that because they know the aircraft radio frequencies are not the same as the cellular phone frequencies, there can be no interference and thus they are justified in using their mobile phone. They do not understand that interference between electronic systems may occur even when the systems operate in separate radio bands. As well, few people understand that even if they are not talking on the phone, if the phone is in "standby" mode, it may be still active and occasionally transmitting on the signalling channels and thus may still be a potential source of interference. As more and more people carry and use mobile phones, there will be more and more operation of these phones in areas where they are nominally prohibited.

In addition, as mobile radio systems are increasingly used for data communications, either through mobile radio systems or separate radio data services, many people will be operating these systems in prohibited areas not realizing that the warning not to operate their cellular phone also applies to their mobile radio fax modem or data service. Many laptop computers with radio modems are operated on aircraft and, therefore, there is a potential that these will interfere with the electronic aircraft equipment.

An effective means to limit the possibility of interference is to reduce the mobile radio transmit power. Several of the radio standards do provide low power modes of operation. If the mobile radio is commanded, via the signalling channels, to operate in the low power modes, their operation may be safe in some areas. Further, the signalling channels may also be used to broadcast (at low power) a message to the mobile handset which prohibits the handset from operation in areas where no level of mobile emissions can be tolerated. Thus the combination of low power operation and appropriate signalling commands can provide a means to protect sensitive areas from mobile radio interference.

New mobile radio systems are currently being developed by the Third Generation Partnership Program (3GPP), a global consortium of national standards associations. Among these are the UMTS (Universal Mobile Telecommunications System) Terrestrial Radio Access Network, commonly known as the UTRAN, and the CDMA2000, a new third generation system which makes use of Code Division Multiple Access (CDMA). Along with the development of these new mobile radio systems, new capabilities are being introduced that can be used to better facilitate the control of interference in protected regions.

One of the features being introduced in the new radio systems is a "location finding" service whereby the geographic location of the mobile radio can be determined. Measurements may be made of the signals transmitted as part of the normal operation of the mobile radio system, or they may be made of signals specifically transmitted for this purpose (for example, global satellite navigation systems such as the Global Positioning System (GPS) provided by the United States Department of Defense). Calculations are then made using these radio signal measurements to determine the spatial location of the mobile radio receiver.

To prevent undesirable radio transmissions there have been proposed several mobile communications systems and mobile terminals having a capability of inhibiting radio transmission. One proposed method of preventing mobile radio transmissions in prohibited areas is described in UK Patent Application GB 2,325,592 published on Nov. 25, 1998, wherein a mobile radio calculates its location based upon radio signals received from at least three surrounding base stations. The mobile stores a plurality of transmission inhibition areas and the transceiver is controlled depending on the location of the mobile radio with respect to the stored inhibition areas. One disadvantage of the above technique is that the prohibited areas must be programmed into the mobile radio and are, thus, not easily adaptable to change. A portion of memory must also be reserved to store these protected areas. Secondly, the location calculation is done within the mobile using downlink radio control signals received from at least three different base stations. This imposes obvious constrains on network configuration.

Another method described in U.S. application Ser. No. 08/957,025 filed on Oct. 24, 1997, proposes a system whereby mobile radios are provided with a low power mode of operation and are commanded, via their signalling channels, to operate in the low power mode when within range of a low power signal from a base station within a protected area. In areas where it may be undesirable to have any radio transmissions, even at low power levels, the base station may broadcast an inhibiting signal which will instruct the mobile not to operate its transmitter while in the area. In this method, the protected region is defined by the region where these inhibiting transmissions can be received. The base stations, in this case, are restricted to specific locations needed to shape the transmission coverage areas to match the protected regions.

Devices, commonly known as jammers, are also sometimes used to block the operation of cellular phones. These devices inhibit operation by transmitting radio power that jams or disrupts the signalling channels of the mobile phone system and thereby prevent the mobiles from operating. Although all incoming and outgoing calls are blocked, these systems do not protect against interference to sensitive equipment as the radio jamming signal must be quite strong to assure it overpowers regular transmissions of the mobile radio system.

There is also another level of interference caused, not by the mobile radios themselves, but by the activities of their users. A common example of this is the ringing of mobile phones in meetings. This is, at best, a minor annoyance but at other times can be a serious disruption as many meeting delegates fumble with their phones to determine if the call is for them. It is especially annoying if people answer and talk on the phone disturbing others in the room. Many restaurants and concert halls prohibit carrying mobile phones for precisely this reason. This is, perhaps, not quite as life threatening as previous examples, but nonetheless is a serious public nuisance.

SUMMARY OF THE INVENTION

Because it is impossible to prevent people from operating mobile radio equipment (e.g. cellular phones or radio fax modems in portable computers) in sensitive areas, the present invention provides an arrangement whereby they can be operated safely in these areas, or the mobile radio can be disabled if the area cannot tolerate any level of mobile emissions.

The present invention provides a new technique for controlling the operation of mobile radios in protected regions by making use of the new "location finding" service capability of the mobile network. It also proposes using broadcast control signals to indicate the type of mobile radio operation (e.g. no audible ringing or outgoing calls only) permitted in the restricted region. The present invention operates in the following way:

(a) A base station with coverage in the sensitive area is installed and operated at a power level such as to be below the level of susceptibility of the sensitive equipment in the area. This base station may be an existing installed base station with suitable coverage and power level.

(b) The base station providing coverage in the sensitive area transmits information on protected region boundaries and conditions of restricted operation (using the mobile radio system broadcast control channels and the signalling mechanisms in the air interface standard).

(c) The mobile radio operation is controlled such that, before it makes any transmissions, it receives and interprets the local broadcast control channels.

(d) The mobile radio makes use of a suitable "location finding" technique to determine its location.

(e) The mobile radio compares its measured location to the protected region boundaries to determine whether or not it is inside a protected region and thus, needs to constrain its operation.

(f) If the mobile radio is within a protected region, it constrains its operation according to the conditions broadcast for that protected region (e.g. low power operation or no audible ringing).

(g) If the mobile radio is not within a protected region, then it operates in the normal (unconstrained) manner.

The notion of a protected region is extended from one which involves just the mobile radio transmitter power to one where mode of use of the mobile is also controlled. Control of operation may include no audible ringing, outgoing calls only, no transmissions at all, low power mode of operation or any other conceivable means to protect against interference and ensure that social etiquette is maintained.

Manufacturers of mobile radio products are often asked how and if it is safe to operate them in sensitive areas. By means of the present invention to assure controlled operation through the use of a suitable "location finding technique" and interpretation of broadcast control messages (decoding of protected region coordinates), radio communication systems can be provided with the possibility of interference in sensitive areas being minimised.

The use of mobile radios is widespread, but they are prohibited in hospitals and aircraft, for example. If an extension to the signalling protocols of the relevant standards is made providing for controlled operation of mobile radio equipment according to the present invention, then the equipment may be used in more areas and without the danger of inadvertent interference because someone forgot or ignored a request to turn off their radio equipment. An additional advantage is that, unlike jammers, the invention uses signalling to restrict operation thereby providing a platform where all calls except emergency calls can be blocked. This is highly desirable as it would assure access to emergency services at all times.

In addition to a new method, the invention also relates to a new base station, a new mobile radio unit and a new mobile communication system including the new base station and mobile radio unit.

Other aspects and features of the present invention will become apparent to those ordinarily skilled in the art upon review of the following description of specific embodiments of the invention in conjunction with the accompanying drawings.

DESCRIPTION OF THE PREFERRED EMBODIMENTS

Figure 1:
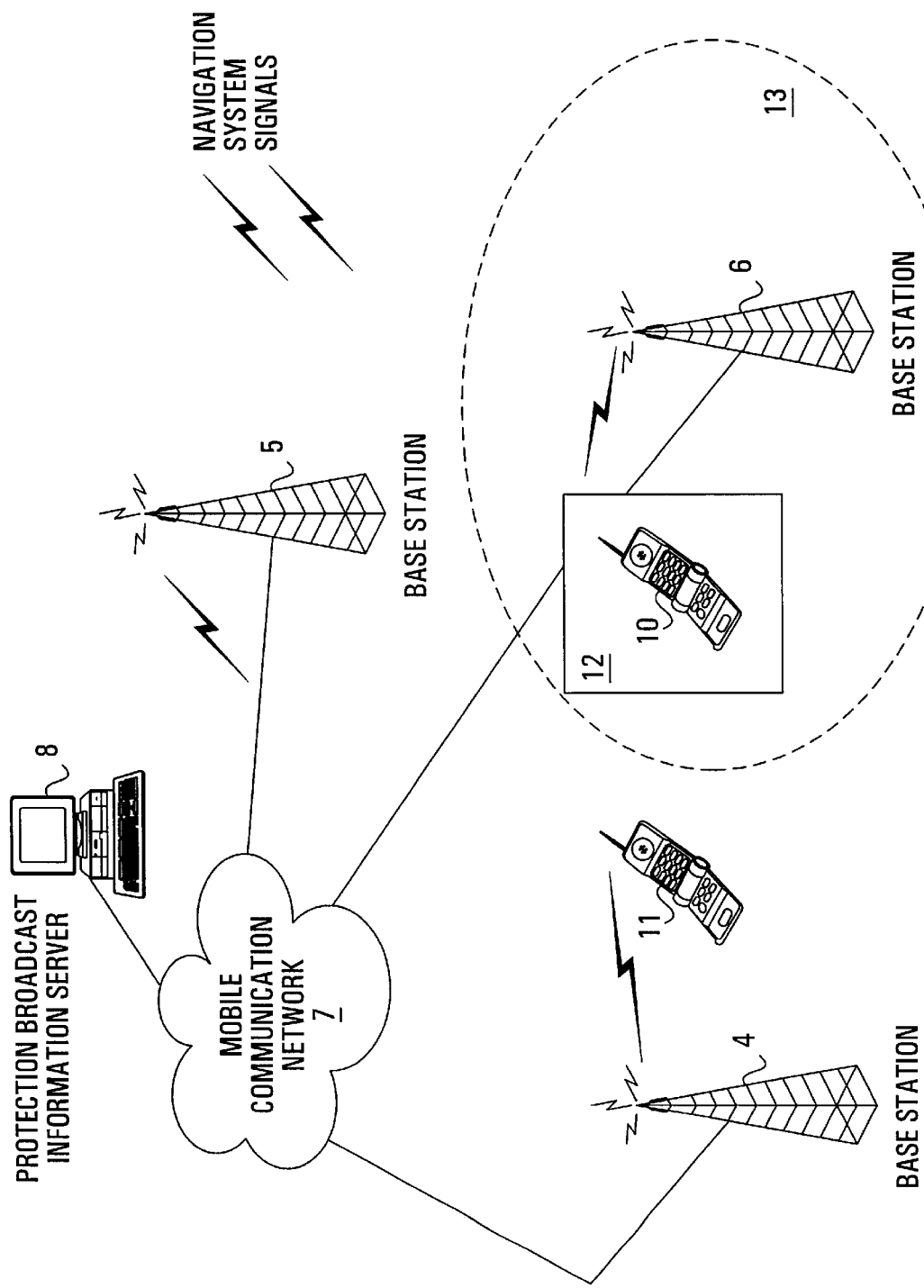
FIG. 1 illustrates a mobile radio communications system with base stations and a mobile radio within a "protected" region

Referring to FIG. 1, a portion of a radio communications system is shown comprising a plurality of base stations and mobile radios. In the example shown, there are three base stations 4, 5 and 6 all connected to a mobile communications network 7 to which is also connected a protection broadcast information server 8. A mobile radio 10 is shown located within a protected (controlled) region 12 and another mobile radio 11 is shown outside the protected region 12. The protected region 12 is assumed to contain equipment sensitive to radio signal interference, e.g. an aeroplane or hospital. The protected region 12 is shown to be within the coverage area 13 of base station 6. The protected region 12 may also be within the coverage area of base stations 4 and 5 as these may all overlap to some extent. The mobile radios communicate with the mobile communications network 7 via the base stations. They can also receive broadcast control messages from the base stations, via their broadcast control channels (signalling channels), including information on protected region boundaries. This information originates from the protection broadcast information server 8 or another equivalent information source. This server may be part of the existing mobile radio system equipment that broadcasts other system information such as the system operator identification and the preferred usage of channels.

The region to be protected is defined generally as a volume of space with geographic boundaries. Although only one protected region 12 is shown, it should be obvious that in any mobile communications network, there may be more than one such protected region. The boundaries may be described by means of the standard latitude and longitude measures of the boundaries of the region inside which mobile radio operations are to be restricted. Information on the boundaries of a protected region is broadcast in the region and in the surrounding region. As mentioned, there may be several regions to be protected, so there may be several sets of coordinates to be broadcast. The information may be broadcast from more than one base station, at least from each one that has coverage of the protected zone.

In addition to protecting against interference due to radio transmissions, the present invention may provide for the inclusion of signalling commands in the broadcast control message to indicate conditions of restricted operation so that it may be safe to operate mobile units in certain areas. These restrictions may include, among others, no transmissions allowed under any circumstances, only emergency transmissions allowed, only non-voice type calls allowed, only incoming calls allowed with no audible ringing, outgoing calls only allowed, only data calls allowed with no audible ringing, only signalling transmissions from the mobile allowed, and no traffic calls. There are many other possibilities. The only requirement is signalling in the broadcast control message to indicate these restrictions.

For example, if the broadcast control message signals the presence of a low power zone, the transmitter of the mobile radio is controlled to adhere to this restriction. The low power zone is defined by a region in which only reduced power transmissions by the mobile station are allowed. The low power zone may be, for example, an aircraft with a small local base station acting as the source of the control signals and the means for communication with the mobile network.

The base stations transmit the broadcast control messages including any other necessary information for determining the location of the mobile at regular intervals. These broadcast control signals may also include base station location information and transmission time stamp information (indicating the time instant when the signal is transmitted by the base station). This broadcast can be most easily done using the broadcast control channels of the mobile radio system, with signals transmitted from a base station with coverage in the protected region (or regions).

An obvious advantage of this new technique is that the region to be protected is defined more of less independently of the coverage area of the transmitters broadcasting the control signals. Therefore, signalling base stations can now be sited at convenient spots and are not restricted to special locations needed to shape the transmission coverage areas to match the protected region(s). In addition, their siting may be chosen to optimise the location finding technique if the measurements are to be made of the mobile radio system signals. Also, if a satellite location service is used, then only a single base station is needed for control transmissions (instead of a set of base stations).

Figure 2:
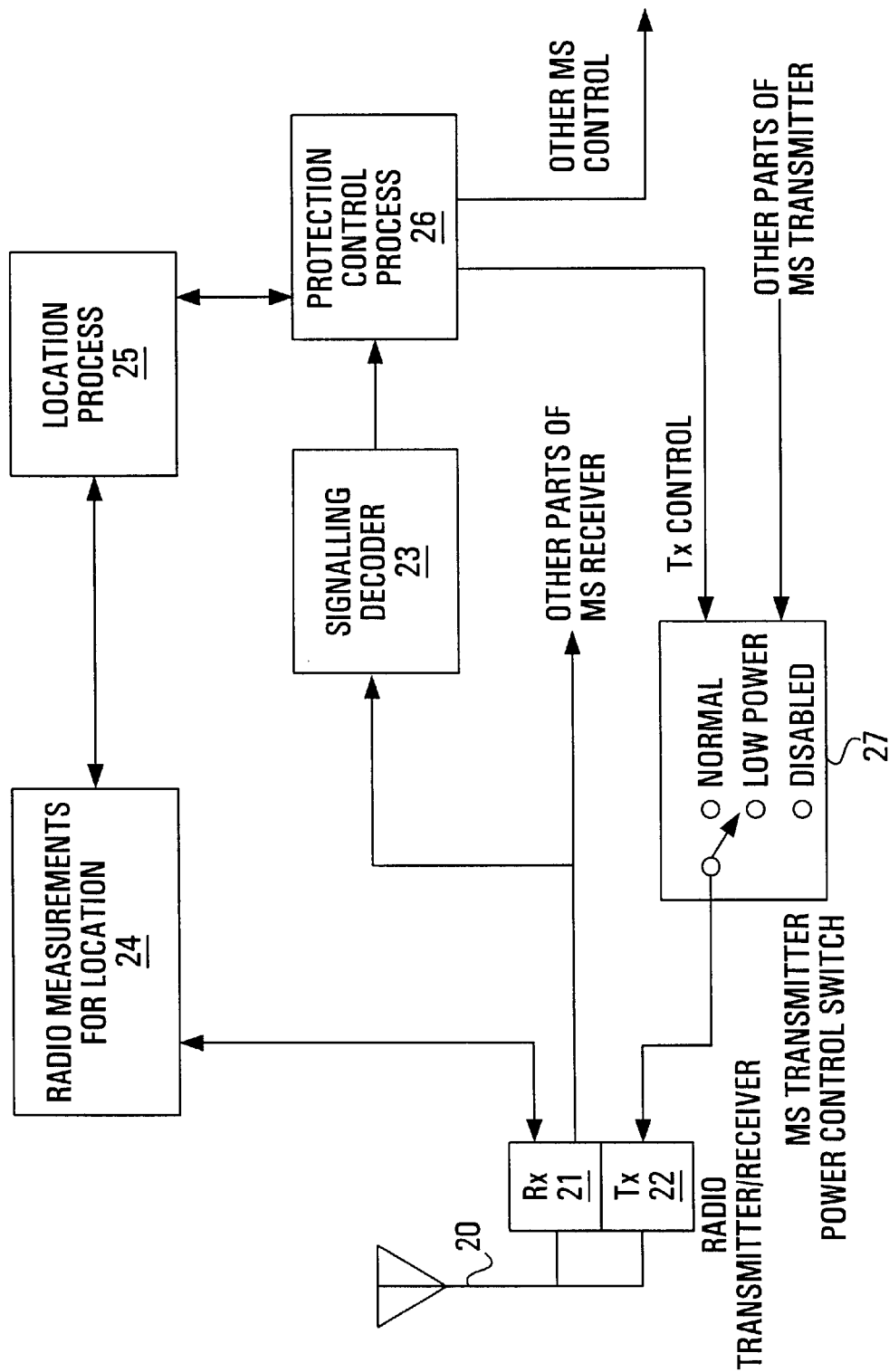
FIG. 2 is a block diagram of part of a mobile radio according to the invention comprising a location measurement process and a process to control operation in response to received signalling information.

FIG. 2 is a block diagram of parts of a mobile station involved in implementing controlled operation in protected regions according to the present invention. The mobile radio includes an antenna 20 and a transceiver portion consisting of a receiver 21 and a transmitter 22. The receiver 21 is connected to a signalling decoder 23 and, through a Radio Measurements for Location section 24, to a Location Process section 25. Both signalling decoder 23 and Location Process section 25 are connected to a Protection Control Process 26 that affects the operation of the mobile station. A transmitter power control switch 27, having an output connected to transmitter 22, is also connected to the Protection Control Process 26. This switch may be used to adjust the power level of the mobile's transmissions according to the restrictions broadcast for the protected zone. The components described above may also be connected to various other parts of the mobile radio as indicated in FIG. 2, the details of which will not be described here as they are well known to persons skilled in the art and form no part of the present invention. Some or all of the blocks 23, 24, 25 and 26 would normally be implemented as software modules.

The broadcast control message, which includes information on protected region boundaries and any possible conditions of restricted operation, is detected by the receiver 21 of the mobile station. The broadcast control message is decoded by signalling decoder 23 to determine the boundaries of protected regions. The location of the mobile is then determined using a known technique (in Location Process 25) in conjunction with radio signal measurements 24. The measured location is compared to the decoded protected region boundaries in Protection Control Process 26. If the mobile is located outside the decoded protected region boundaries, then the Protection Control Process 26 may allow the mobile unit to operate normally by setting the Power Control Switch 27 to normal and/or allowing other parts of the mobile to make and receive calls normally. If the mobile is located within a protected region, however, the Protection Control Process 26 will constrain operation of the mobile according to the restrictions for that region received from the warning broadcasts. Many constraints and their combinations are possible. For example, if only low power operation is allowed, the Protection Control Process 26 may switch the Power Control Switch 27 to low power mode. If no transmissions are allowed, the Protection Control Process 26 may switch the Power Control Switch 27 to disable the transmitter.

Other restrictions or constraints within the protected zone may include no audible ringing, no outgoing voice calls or emergency transmissions only and these would be controlled by Protection Control Process 26 communicating with the other parts of the mobile that operate these features and disabling or enabling their operation as appropriate. The Protection Control Process 26 may conveniently be implemented as a software process operating in the existing microprocessor that controls the general operation of the mobile. In this arrangement the Protection Control Process 26 may easily control other functions within the mobile.

In a preferred implementation, the broadcast information would perhaps best be sent in a two-phase process. Firstly, a general warning signal is sent frequently on the broadcast channel. Less often, there is a detailed full broadcast of the protected region boundaries and conditions of restricted operation. The mobile radio units, which receive the warning broadcasts, will also receive the less frequent detailed full broadcast for interpretation. If a mobile unit does not receive any warning signal, then it is not near a sensitive area and may continue to operate unrestricted without having to decode the detailed full broadcast or compare its own location with that of the protected zone. Only if the general warning signal is received does the mobile unit have to carry out all the software steps. This two-phase process is preferred to frequent full broadcasts because the protected region coordinates may be a long string of data (to accurately define the region) and so, too frequent a detailed full broadcast may occupy excessive capacity on the broadcast channel.

As previously mentioned, the transmission coverage of the control message broadcast need not exactly align with the region to be protected as the protected region is defined by the information transmitted in the control message. For example, the region over which the control message is broadcast may be larger than the region to be protected. It must, at least, include the region to be protected. However, it should not be too much larger as all mobile radios receiving the warning would need to ascertain their respective locations and any unable to do so must default to limited transmission. Obviously, with this technique, it is necessary that it be allowed to have mobile radio control signals existing within the protected region (as it is presumed that the mobile is always able to receive the warning and determine its location).

Figure 3:
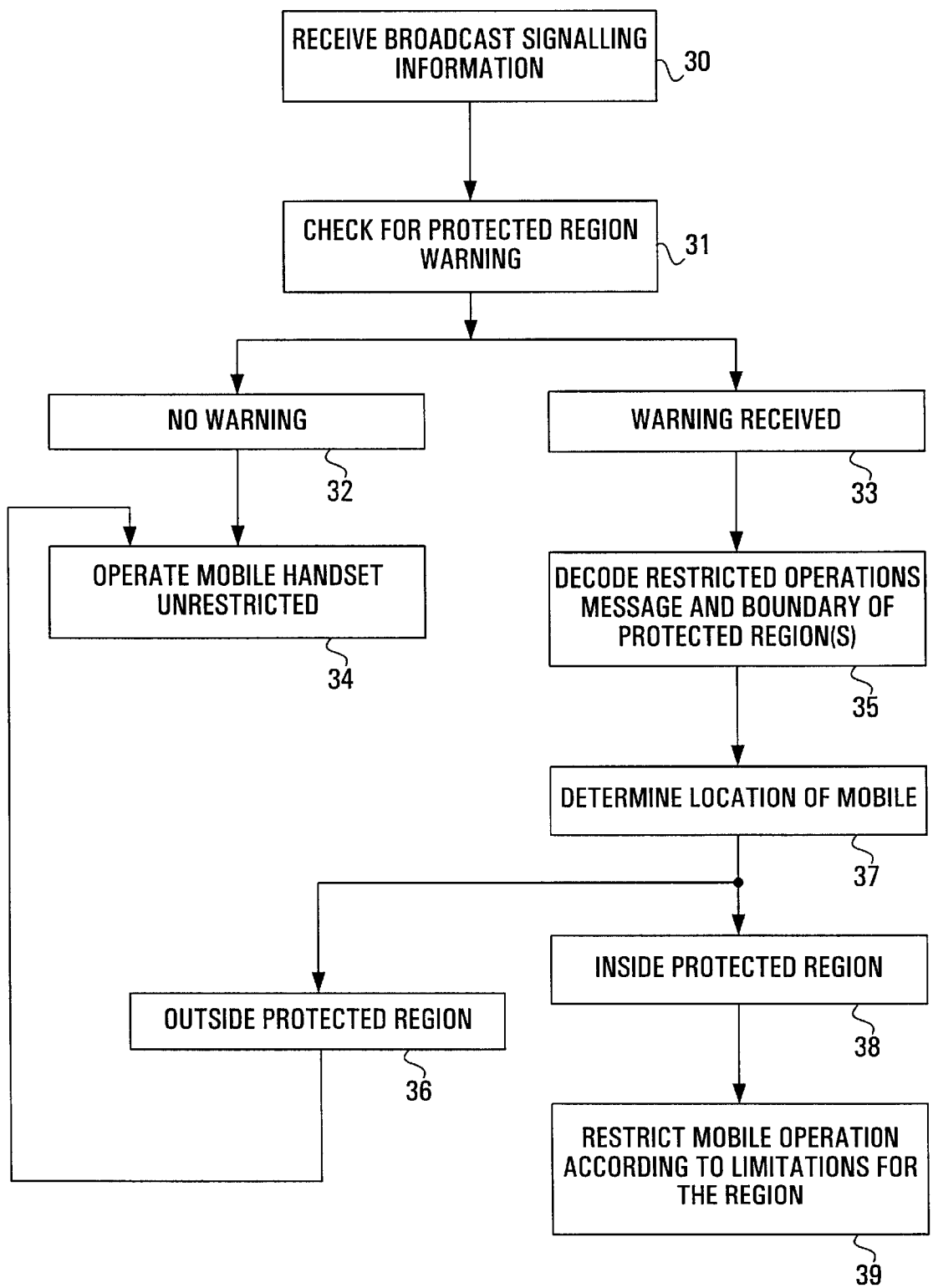
FIG. 3 is a flow chart depicting the steps carried out in the operation of a system according to the invention.

FIG. 3 is a flow chart depicting the sequence of logic followed by the mobile radio upon receiving control messages from base stations. It is assumed here that the broadcast of control messages occurs in the two-phase process previously described. As shown in box 30 and as described in relation to FIG. 2, the mobile radio receives broadcast signalling information via the receiver 21 portion of its transceiver. The mobile station then checks for any warnings of protected regions, as depicted by box 31. If a warning signal from a base station is detected, as shown in box 33, this indicates that the mobile is either within or near a protected region. The mobile then decodes the received broadcast control message, box 35, for boundaries of the region in which operation of the mobile is to be controlled and for any conditions of restricted operation. Each mobile radio receiving the warning signals will then use the known location finding technique to determine its geographic location, box 37. This measured location is then compared against the boundaries of the protected region and, if the mobile is found to be inside the protected region, illustrated by box 38, its operation will be restricted according to the prescribed limitations for the region, indicated by box 39. However, if the location of the mobile is determined to be outside the protected region, box 36, it may continue to operate unrestricted and make its transmissions as it normally would, shown by box 34. Similarly, if the mobile does not receive any warnings of protected regions, box 32, then it too continues to operate unrestricted, indicated by box 34.

The check for protected region warning signals needs to be done each time the mobile unit prepares,to transmit as it may be moving and hence, may move into or out of protected region(s). Depending on the rate of motion of the mobile, the relative size of the protected region, and how far away the mobile has determined that it is from the protected region(s), this warning check should be done perhaps every few seconds.

The protection zone boundaries and coverage of the warning broadcasts must be also be suitable for the zone and traffic in the region. For example, if the protected zone is traversed by a highway that will involve fast moving mobiles, the boundaries of the protected region must be adjusted (outwards) so that a mobile will have time to receive and process the warning signals before it is too late. The extent of the outward expansion will be governed by the expected speed of the mobiles, the frequency of the warning broadcasts and the processing response time of the mobiles. In other situations where fast moving mobiles pass adjacent to a protected zone, such as an auditorium, the boundary adjustment heeded may be quite small as none of the fast moving mobiles (e.g. contained within automobiles) may be expected to enter the protected zone (except by accident) and so they need not be considered. People will walk in and out of the auditorium but, in this case, the few seconds it takes to pass through the lobby will be sufficient for the mobile to adapt to the protected zone.

The process steps of FIG. 3 may be conveniently implemented by control software running in a suitable microprocessor contained within the mobile unit. Each mobile could have, say for example, a general purpose microprocessor (microcontroller) which performs the operations of the mobile including operating the keyboard, display, user interface and which also interfaces to the radio system signalling. The location determination program 37 may be stored in a number of places including read-only memory (ROM) or random-access memory (RAM). Some of it could also be implemented in hardware (gates etc.) and not in memory. If the Protection Control Process is implemented by software operating in this control microprocessor, it may easily control other functions within the mobile relating to the broadcast restrictions. The microprocessor, itself, may further be connected to random-access memory (RAM) which may be used to store received messages and other information such as arrival time, base station location information and time stamp information of any received control signals. Therefore, the control logic for carrying out the invention may be implemented by any suitable technique be it software, hardware or a combination of the two.

It is obvious, then, that the software/firmware of standard mobiles will need to be upgraded to support these new features. This may be done in one of two ways. One is to provide the new (modified) software/firmware when the mobile is manufactured. Alternatively, there are now protocols being developed to allow feature software to be downloaded into the mobile unit over-the-air. Referred to as Wireless Applications Programming, or WAP, this requires an applications programming environment within the mobile to support operating the new software. In this alternative, the base stations that are broadcasting the location warnings could also send out the needed software features for the mobile units to enable them to operate safely in protected regions.

With regard to the location determination of mobile radio equipment, any known technique familiar to those skilled in the art may be employed. GPS (Global Positioning System) is a good technique, for example. So are the various OTDOA (Observed Time Difference Of Arrival) techniques in which the mobile unit measures the observed time difference of arrival of signals transmitted by the mobile radio system. For example, the location calculator may be comprised of a detector for detecting the reception time of a radio control signal received from each of, say, three base stations. A distance between the mobile radio equipment and each of the base stations is calculated based on the time elapsed between transmission and reception of the radio control signal obtained from the reception time and transmission time. The location of the mobile can be determined from these three distances in conjunction with the base station location information.

Alternatively, the warning and limitations could be broadcast on the mobile radio broadcast control channels, with the location of the mobile determined using the GPS system. This is a "hybrid" implementation. This technique can also be used with existing mobile radio systems (such as GSM) which may otherwise make use of a location service utilising up-link (mobile station towards base station) signals.

However, the location finding technique preferred for incorporation into the invention must generally be based on the receipt of downlink signals (base station to mobile radio) at the mobile radio since the mobile station may be in a fully protected zone and, therefore, not be allowed to transmit. In other words, the calculation of the location of the mobile based on the measurements (of downlink signals) is done locally in the mobile. That is, it cannot make use of a calculation server or query a database of coordinates in the network. The implication here is that the base station coordinates being measured must be broadcast. As well, synchronisation of their transmissions must be fixed. This synchronisation is not a problem for coverage in a small area (reasonably small such as a room within a building or perhaps throughout a factory site). In these cases, synchronisation can be achieved with wires (fibre etc.) and coordinates can be given as offsets from one another, not full details (i.e. may use relative coordinate offsets both to define the base stations and the protected region, so do not need absolute latitude and longitude numbers). If the synchronisation of the transmission times is not zero, the time offset values can be broadcast in a similar way to the geographic coordinates of base station transmitters.

It is obvious that there will be some uncertainty involved in both the definition of the protected region and the measured location of the mobile. As part of the broadcast transmission defining the protected region, additional information may also be included to define the accuracy needed for establishing measurements and for comparison with the boundaries of the protected region. There may not be the same accuracy limits on all sides and in all directions. Many protected regions may be less sensitive to interference at their edges and, so, may be able to accommodate some penetration of the edges as long as the core region is protected.

The broadcast control channels may also broadcast auxiliary information which can assist the location service, such as GPS. This auxiliary information may include information on the current time and the currently observable GPS satellites that may speed the operation of the GPS service and/or improve its accuracy. For example, differential GPS information may be included in the broadcast to improve the accuracy of the GPS location measurements.

The transmission of control signals to indicate protected region boundaries and conditions of restricted operation are by base stations operating in the appropriate mobile cellular radio bands. To do these transmissions, normally, the transmitter operator must have a license from the spectrum regulator. This is the mobile system operator, normally. Therefore, the message broadcast signalling of protected regions must be done in co-operation with the operator. However, it is quite feasible that a "limited capability" base station, which only transmits control signals over a limited region and does not handle any mobile radio traffic, could perhaps be installed, owned and operated by the owner of a protected region who may wish to restrict operation of mobile radio equipment on their premises (independent of the mobile system operator). Therefore, the warning broadcast base stations may be full base stations, that are capable of carrying the usual mobile radio system traffic, or they may be so-called "limited capability" base stations which simply transmit the appropriate broadcast control signals to provide warning and radio signals for location measurement.

In this respect, signalling only base stations could be used in place of traditional jammer units which block all transmissions. Operators and spectrum regulators want to assure access to emergency services at all times and by using signalling to restrict operation, the invention provides a platform for all calls except emergency transmissions to be blocked. That is, in operation the protected zone could be generally restricted to allow no call activity except emergency calls, the supposition being that an emergency call would be more important than the danger of interference (or etiquette) in the zone. Although this might not always be true, it may be for some regions such as a theatre or concert hall. This feature could be implemented with appropriate control software in the mobile and base stations. Specifically, the restrictions broadcast for the protected zone would include the option of allowing emergency calls only. The mobile unit would then operate its restriction-control process (software) to allow an emergency call, but block all others.

As to determining when an emergency call is being made, some mobiles may include an emergency button that makes recognising them-very easy. Others may not, and the mobile control software would then examine the dialed digits for an emergency number, such as 911. In any case, if this or another emergency dialing string is found, or the emergency button is operated, then the Protection Control Process (software) may allow the call inside the restricted zone of operation. Otherwise, the call is blocked by the Protection Control Process.

With regards to the case of a moving protected region, such as an aircraft, one could also conceivably put a couple of "limited capability" transmitters on the vessel.

Then, using them to determine its relative location, a mobile unit onboard the aircraft would find that it was always inside a protected region and would, therefore, be restricted from operating.

The broadcast warning, boundaries of the protected region, information on base station locations, offset location technique and the various types of restricted transmissions need to be defined in a universal way so that they can be understood by all mobiles that may wander into the region. All mobiles must look for and heed the warnings and restrictions. At this early stage in the development of Third Generation mobile systems, it is crucial that this requirement be defined as part of the standards from the outset since no new mobiles are in the field yet. This will make it possible for all mobiles to adhere to the restrictions in the future.

The specific embodiments described make use of mobile cell phones but it is within the ambit of the present invention to use other mobile radio devices such as laptop computers with mobile radio fax modems. Accordingly, the more generic term "mobile radio unit" will serve to include all types of mobile radio devices capable of communicating with base stations in a mobile communications system.

Numerous modifications and variations of the present invention are possible in light of the above teachings. It is therefore to be understood that within the scope of the appended claims, the invention may be practised otherwise than as specifically described herein.

What is claimed is:

1. In a mobile communications system having base stations communicating with mobile radio units, a method of restricting the operation of a mobile radio unit when within a protected zone, the method comprising:

providing at least one base station within or near the protected zone to broadcast information specifying the geographic location of the boundaries of the protected zone;

said at least one base station having a coverage area overlapping the protected zone transmitting a warning signal within its coverage area;

the mobile radio unit receiving the broadcast information from the at least one base station;

determining the geographic location of the mobile radio unit receiving the broadcast information from the at least one base station;

the mobile radio unit determining on the basis of the broadcast information and its geographic location whether the mobile radio unit is located within the protected zone only if the mobile radio unit has received the warning signal; and the mobile radio unit restricting operation of the mobile radio unit if it is within the protected zone.

2. A method as claimed in claim 1, wherein the warning signal is transmitted more frequently than the information specifying the geographical location of the protected zone.

3. A mobile communications system comprising a plurality of base stations in communication with a plurality of mobile radio units, at least one of the base stations being arranged to broadcast information specifying the geographic location of the boundaries of a protected zone and at least some of the mobile radio units each being arranged to receive the broadcast information and determine whether or not it is located within the protected zone, the at least some of the mobile units each being arranged to go into a restricted operation mode if it is located within the protected zone, wherein the at least one base station is arranged to broadcast, in addition to the information specifying the geographic location of the protected zone, a warning signal indicating that the protected zone is nearby and wherein each of the at least some of the mobile radio units is arranged to determine whether or not it is located within the protected zone only if it has received the waning signal.

4. A base station for use in a mobile communications system, the base station arranged to broadcast information specifying the geographic location of the boundaries of protected zone within which operation of a mobile radio unit is restricted only if the mobile radio unit has received a warning signal, wherein the base station is arranged to broadcast additionally the warning signal indicating that the protected zone is nearby.

5. A base station as claimed in claim 4, wherein the base station is arranged to broadcast additionally information specifying one of a plurality of different types of restricted operation modes.

6. A mobile radio unit for use with base stations in a mobile communication system, the mobile radio unit being arranged to receive broadcast information specifying the geographic location of the boundaries of a protected zone, the mobile radio unit being arranged to determine whether or not it is located within the protected zone and, if it is, being arranged to go into a restricted operation mode, wherein the mobile unit is arranged to receive a warning signal that a protected zone is nearby and to determine whether or not the mobile radio unit is located within the protected zone only if it has received the warning signal.

7. A mobile radio unit comprising:

a transceiver for communicating with base stations in a mobile communication system;

a decoder connected to the transceiver for decoding control messages broadcast by a base station specifying the coordinates of a protected zone and a warning signal indicating that the protected zone is nearby;

a protection control processor connected to receive the coordinates from the decoder and to receive coordinates specifying the actual location of the mobile radio unit, the protection control processor comprising means to determine only if the mobile radio unit has received the warning signal whether the coordinates specifying the actual location of the mobile radio unit lie within the coordinates specifying the restricted zone and means generating a control signal determining a predetermined mode of operation of the mobile radio unit according to whether the coordinates specifying the actual location of the mobile radio unit lie within the coordinates specifying the restricted zone, only if the mobile radio unit has received the warning signal.

8. A mobile radio unit as claimed in claim 7 further comprising location detection means for determining the coordinates specifying the actual location of the mobile radio unit, the location detection means being connected between the control processor and the transceiver.

9. A method of programming from a base station a mobile radio unit comprising downloading from the base station via a wireless link feature software that configures the mobile radio unit:

a) to receive broadcast information specifying the geographical location of the boundaries of a protected zone and to receive a warning signal indicating that the protected zone is nearby;

b) to determine whether or not the mobile radio unit is located within the protected zone only if the mobile radio unit has received the warning signal; and c) to go into a restricted operation mode if the mobile radio unit is within a protected zone; and d) upon receipt of a warning signal indicating that the protected zone is nearby.

* * * * *